United States Patent [19]
Sturhan

[11] 3,977,644
[45] Aug. 31, 1976

[54] SEAT CONSTRUCTION

[75] Inventor: Klaus Sturhan, Lemgo, Germany

[73] Assignee: Gebr. Isringhausen, Lemgo, Lippe, Germany

[22] Filed: June 24, 1974

[21] Appl. No.: 482,474

[30] Foreign Application Priority Data
June 25, 1973 Germany............................ 2332238

[52] U.S. Cl................................ 248/384; 248/419; 248/423
[51] Int. Cl.².......................................... A45D 19/04
[58] Field of Search ........... 248/397, 384, 157, 419, 248/420, 423, 376, 377, 395; 297/345, 346

[56] References Cited
UNITED STATES PATENTS

| | | | |
|---|---|---|---|
| 2,076,309 | 4/1937 | Whedon | 248/419 |
| 2,809,689 | 10/1957 | Garvey et al. | 248/419 |
| 3,008,681 | 11/1961 | Matthews | 248/395 |
| 3,137,473 | 6/1964 | Augunas | 248/419 |
| 3,147,945 | 9/1964 | Leslie et al. | 248/419 |
| 3,188,044 | 6/1965 | Epple | 248/419 |
| 3,319,921 | 5/1967 | Nichols | 297/346 |
| 3,473,776 | 10/1969 | Costin | 248/419 |

*Primary Examiner*—Roy D. Frazier
*Assistant Examiner*—Robert A. Hafer
*Attorney, Agent, or Firm*—Michael J. Striker

[57] ABSTRACT

A seat, particularly a vehicle seat, has a support element and a seat element which is located above the support element. An arrangement is provided for raising and lowering the seat element relative to the support element. This arrangement includes a lever having one end that is shiftably and arrestably mounted, and another end. A substantially U-shaped bracket has an open side facing away from the lever and the bracket is pivotally connected to the lever and has one arm that is pivoted to one of the elements, and another arm to which a strap is pivoted having a length substantially corresponding to that of the other arm and being connected to the other element and pivoted to the other arm, respectively.

10 Claims, 4 Drawing Figures

3,977,644

SEAT CONSTRUCTION

BACKGROUND OF THE INVENTION

The present invention relates generally to a seat, and more particularly but not exclusively to a vehicle seat such as is used in motor vehicles and the like.

Still more specifically, the invention relates to an adjustment for raising and lowering the seat in a seat structure.

It is known in the prior art to provide an arrangement for adjusting the height of a motor vehicle seat by having a straight-line elongated carrying bracket which is pivotally attached at one of its ends to the seat frame, and at the other end to the seat on the frame, that is the support element for the seat. The angle at which the carrying bracket is inclined with reference to the support element and the seat frame, and the length of the bracket, determine the distance between the seat frame and the support element in the prior art. One end of a supporting lever is pivotally mounted approximately at the mid-point of the bracket, in bearings on the underframe, so as to be movable and capable of being arrested. The angle of inclination of the bracket, and therefore the distance between the seat frame and the under frame, can be regulated by displacement of that end of the supporting lever which is movably mounted in bearings.

It is a disadvantage of the prior-art constructions that they require even in the completely retracted state a relatively large amount of space. This is disadvantageous because the under frame or support element of a motor vehicle seat must, for instance, accept hydraulic or pneumatic elements for damping of vibrations, load adjustment and the like, such as shock absorbers, and must in addition have sufficient floor clearance. In such constructions the prior-art arrangements for seats that can be raised and lowered are frequently not usable, because their installation height is such as to preclude their use due to space limitations. Attempts to overcome these problems have been made, but have invariably succeeded only in lowering the installation height of the seat at the expense of the desired optimum adaptation of the seat to the physical characteristics of a particular occupant.

Summary of the Invention

Accordingly, it is a general object of the present invention to provide an improved adjustable seat, particularly but not exclusively for motor vehicles, which avoids the aforementioned disadvantages.

More particularly, it is an object of the present invention to provide such an improved seat construction which will permit a maximum possible height adjustment but has an extremely small installation height.

An additional object of the invention is to provide such a seat which is simple to manufacture.

Another object of the invention is to provide such a seat which can be simply but with complete safety operated by a user, even during the travel of the motor vehicle or the like in which it may be installed.

In keeping with the above objects, and with others which will become apparent hereafter, one feature of the invention resides in a seat, particularly a vehicle seat, having a combination which comprises a support element and a seat element above the support element. Means is provided for raising and lowering the seat element relative to the support element, and this means comprises a first lever having one end that is mounted shiftably and arrestably and another end, a substantially U-shaped second lever having an open side facing away from the first lever, the second lever being pivotally connected to the first lever and having one arm pivoted to one of the elements and another arm, and a strap having a length substantially corresponding to the length of the other arm and being pivoted to the latter and connected to the other of the elements, respectively.

This construction avoids the disadvantages of the prior art, and affords the advantages which are sought according to the present invention.

The use of the U-shaped second lever or bracket makes it possible for the latter to be retracted flat into the seat frame, that is the frame of the seat element, by means of the compensating shackle or strap, and the first or supporting lever, so that in effect the second lever folds up within the seat frame about its pivot point on the compensating strap. In the fully retracted state the second lever therefore requires no more space (as to the height) than the seat frame itself. The pivoting of the first lever at its farthest end that is connected to the U-shaped second lever, and the fact that the latter opens in the direction away from the first lever, in conjunction with the pivotal attachment of the support element to the base of the second lever, makes it additionally possible to decrease the installation height relative to the height of the seat frame still further. The seat which is thus obtained is of extremely flat (i.e. low) installation height.

Despite this, the seat according to the present invention permits a maximum range of adjustments in height, since the lever system which, as a whole, may also be termed a "folding rocker arm", makes it possible to obtain a height adjustment in excess of the length of the second lever, especially because of the presence of the strap. This compensating strap can be designed of any necessary size and length, since it engages along the side of the under frame of the seat and does not interfere with the same during retraction into the seat frame. In addition, the maximum possible displacement of the height of the folding rocker arm is, as will be seen, determined by the length of the first lever which is pivoted to the second lever. The length of this first lever can be freely chosen without having to worry that interference might occur between the folding rocker arm and the under frame of the seat in operation of the device. In extended state the first lever still engages along the under frame of the seat at the side of the latter, and in the fully retracted state the first lever is situated parallel to and substantially aligned within the seat frame.

In some instances the length of the first lever may be chosen to be very substantial, and in these cases it may occur that in the fully retracted state the width transversely of the seat of the device according to the present invention may be greater than half the depth of the seat or of the seat frame. In this case it is advisable to install the neighboring devices on the same side of the seat, at the rear or front edge, in planes which are displaced relative to each other by the width of the folding rocker arm according to the invention, so that during retraction the first levers of the devices are able to pass each other and the entire width of the seat or of the seat frame is available for retraction of the folding rocker arm.

The strap may be welded to the seat frame, in which case the folding rocker arm is inherently stable and will compell the front or rear side of the seat which is opposite to the rocker arm to traverse a circular arc during the height adjustment. A particularly advantageous form of the invention provides for the strap to be pivoted to the seat frame, thus making it possible for the second lever to be pushed forward during retraction of the adjustment device, as far as the region of the front and rear crossbeam of the seat frame, so that the available depth of the seat or seat frame is utilized to optimum advantage.

The length of the arm of the U-shaped second lever which is associated with the first lever is advantageously the same as the height of the seat frame, and the end of the first lever which is pivotally connected to the second lever is slightly cranked or offset, so that a particularly advantageous low installation height is produced.

If the strap is pivotally connected to the seat frame, the extended folding rocker arm, that is the arm in extended condition, might be unstable. This can be eliminated by providing at least one stabilizing rod which is pivoted at one end to the seat frame and at its other end to the second lever, but it will be appreciated that other devices in place of a stabilizing rod could also be used, to obtain a four-pivot linkage which makes the rocker arm stable when in extended condition. For example, the pivot of the first lever which is mounted so as to be movable and capable of being arrested, may be fixed against rotation in its arrested state by means of teeth or the like.

A particularly simple construction provides for the first lever to carry a pin which is guided in a longitudinal slot formed in the seat frame and which can be moved against the force of a spring which is attached to the pin. The pin is advantageously arrested in its desired positions by means of a toothed arresting plate which is pivotally attached to the seat frame and engages the pin. The device for adjustment of the seat can then be regulated by the occupant by manual pivoting of the arresting plate. A particularly convenient embodiment provides for the arresting device to be mounted on the seat frame; with such an arrangement the operating elements of the arresting device are always at the same distance from the occupant of the seat, even though the height of the seat is being adjusted.

A further simplification in relation to the height adjustment and the tilting of the seat according to the present invention can be produced when two front or two rear devices of the type disclosed herein can both be locked by means of a single arrangement. For this purpose it is advantageous if the two front or the two rear devices, which are located at opposite sides of the seat, are connected together by a shaft which in each case will be fixed against rotation at the end of the base of the second lever adjacent the compensating strap. This permits for simultaneous operation of the two devices located at opposite sides of the seat without in any way disadvantageously influencing the desired small installation height.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
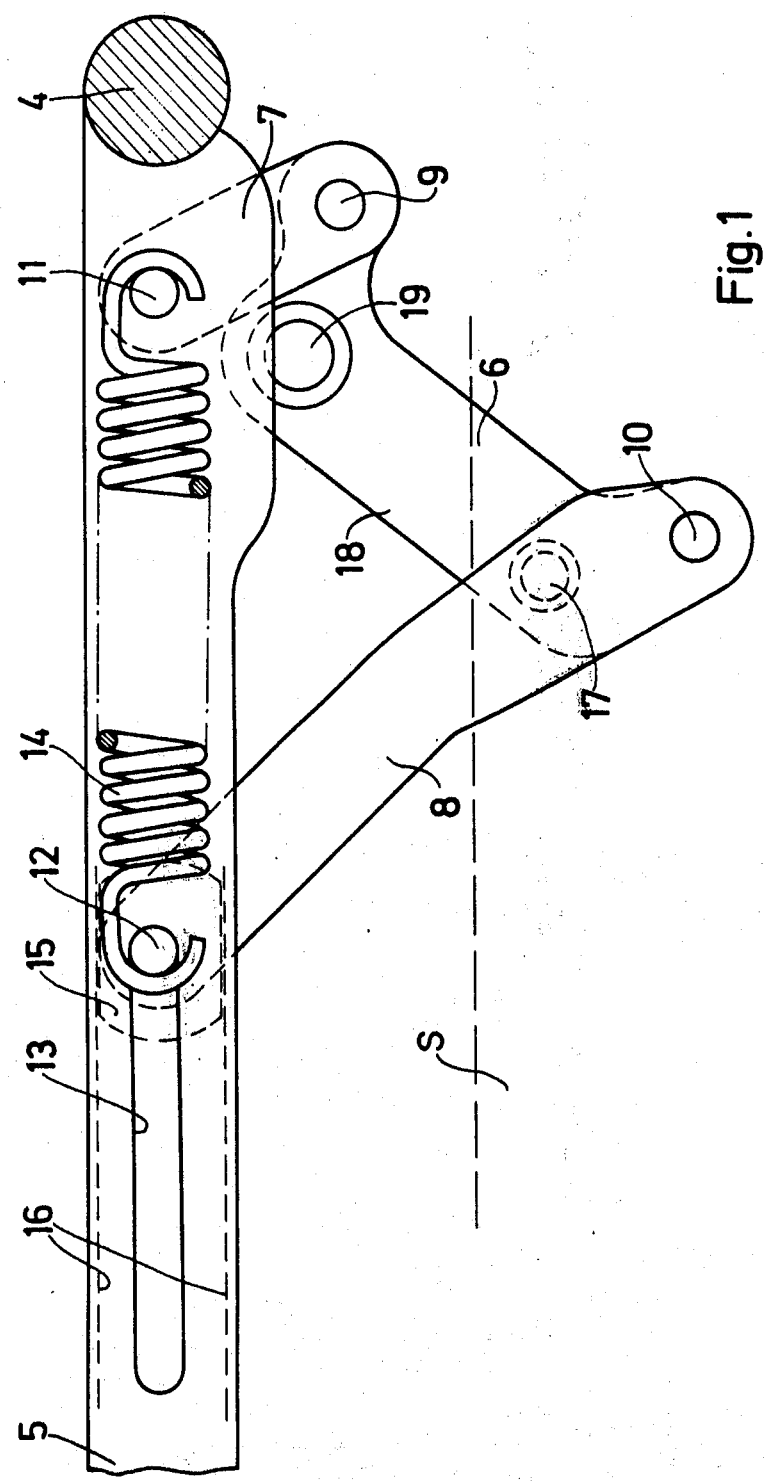
FIG. 1 is a fragmentary partly sectioned side elevation illustrating an embodiment of the invention.
Figure 2:
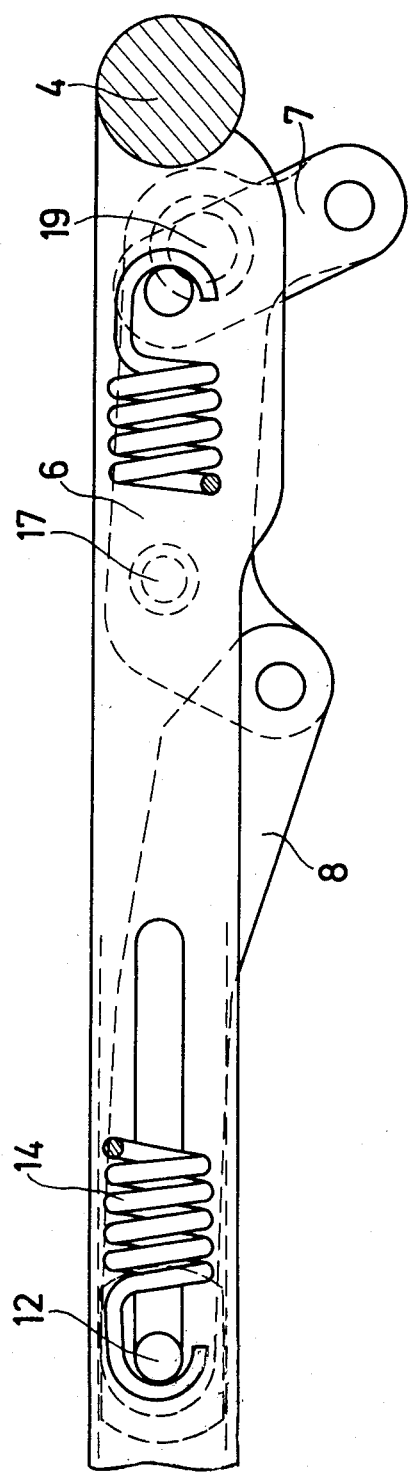
FIG. 2 is the same view as FIG. 1, but illustrating the device in retracted state.

Discussing the drawing in detail, and referring firstly to the embodiment in FIGS. 1 and 2, it will be seen that reference numeral 4 identifies either the front or rear crossbar of a vehicle seat. For purposes of convenience it will be assumed herein that it is the rear crossbar that is so identified. The vehicle seat frame of which reference numeral 4 identifies a crossbar has lateral portions, one of which is shown and identified with reference numeral 5; since for purposes of explanation it is assumed that reference numeral 4 identifies the rear crossbar, it follows that a similar but not illustrated crossbar would be located at the left-hand end of the illustrated side portion 5. Adjusting devices for raising and lowering the seat frame and therefore the seat (which need not be illustrated but is supported on the seat frame) are provided at both lateral sides of the seat frame 5. Only one is shown, but the other should be understood to be spaced from the illustrated adjusting arrangement in direction normal to the plane of FIG. 1.

Each of the adjusting arrangements, of which the illustrated one is representative, has a first lever 8, a compensating strap 7, and a second lever or bracket 6. The latter is substantially U-shaped and its open side, that is the open side of the U-shaped configuration, faces away from the lever 8. The strap 7 is pivoted at 9 to one arm of the lever 6, and the lever 8 is pivoted at 10 to the other arm of the lever 6, whose bight is identified with reference numeral 18. The opposite end of the strap 7 is pivoted to the seat frame portion 5 by means of the pivot 11.

The end of the lever 8 which is remote from the lever 6 is provided with a pin or similar projection 12 which is received and guided in a longitudinally extending slot 13 of the seat frame portion 5, and which can be shifted longitudinally in this slot against the biasing force of a spring 14 which is hooked onto the pin 12 and is also secured to the pivot 11. Improved guidance for the pin 12 is obtained in that the latter is journalled in a slide member 15 which is mounted so that it can shift parallel to the general plane of the slot 13.

The construction thus far described in effect is a foldable rocker arm, and is connected via a pivot 17 with the only diagrammatically illustrated support element, such as a subframe or the like, which is identified with reference character S. According to the present invention the pivot 17 is formed at that end of the bight 18 which is adjacent to the arm of the lever 6 to which the lever 8 is connected. At the opposite end of the bight 18 there is provided a shaft 19 which is connected with the lever 6 so as not to be rotatable relative to the same and which extends normal to the plane of FIG. 1 to be connected with a similar lever 6 of the second not visible arrangement provided at the other lateral side of the seat. By operating the shaft 19, both of the arrangements can be operated simultaneously, which means that only a single arresting device is required (see FIG. 4).

While FIG. 1 shows the arrangement in the fully extended position, in which the seat on the seat frame 5 assumes its highest position, FIG. 2 shows the arrangement in its fully retracted position in which the seat is at the lowest position which it can assume. It is evident that the installation height of the arrangement according to the present invention is extremely small, and that only the strap 7 extends slightly below the level of the seat frame having the portions 5. However, since the strap 7 is located in a side region of the seat and in the immediate vicinity of the crossbar 4 which constitutes the rear edge (or the front edge, depending upon where the arrangements are located) of the seat, its projection does not in any way interfere with the downward retraction of the seat frame. The same is true also of the shaft 19 which in the retracted position is located immediately adjacent and parallel to the crossbar 4.

According to an advantageous embodiment of the invention the length of the arm of the lever 6 to which the lever 8 is pivoted, may essentially correspond to the height of the side portions 5 of the seat frame, and if in addition the lever 8 is slightly offset as illustrated in FIG. 1, then even lower installation heights can be obtained for the arrangement.

Figure 4:
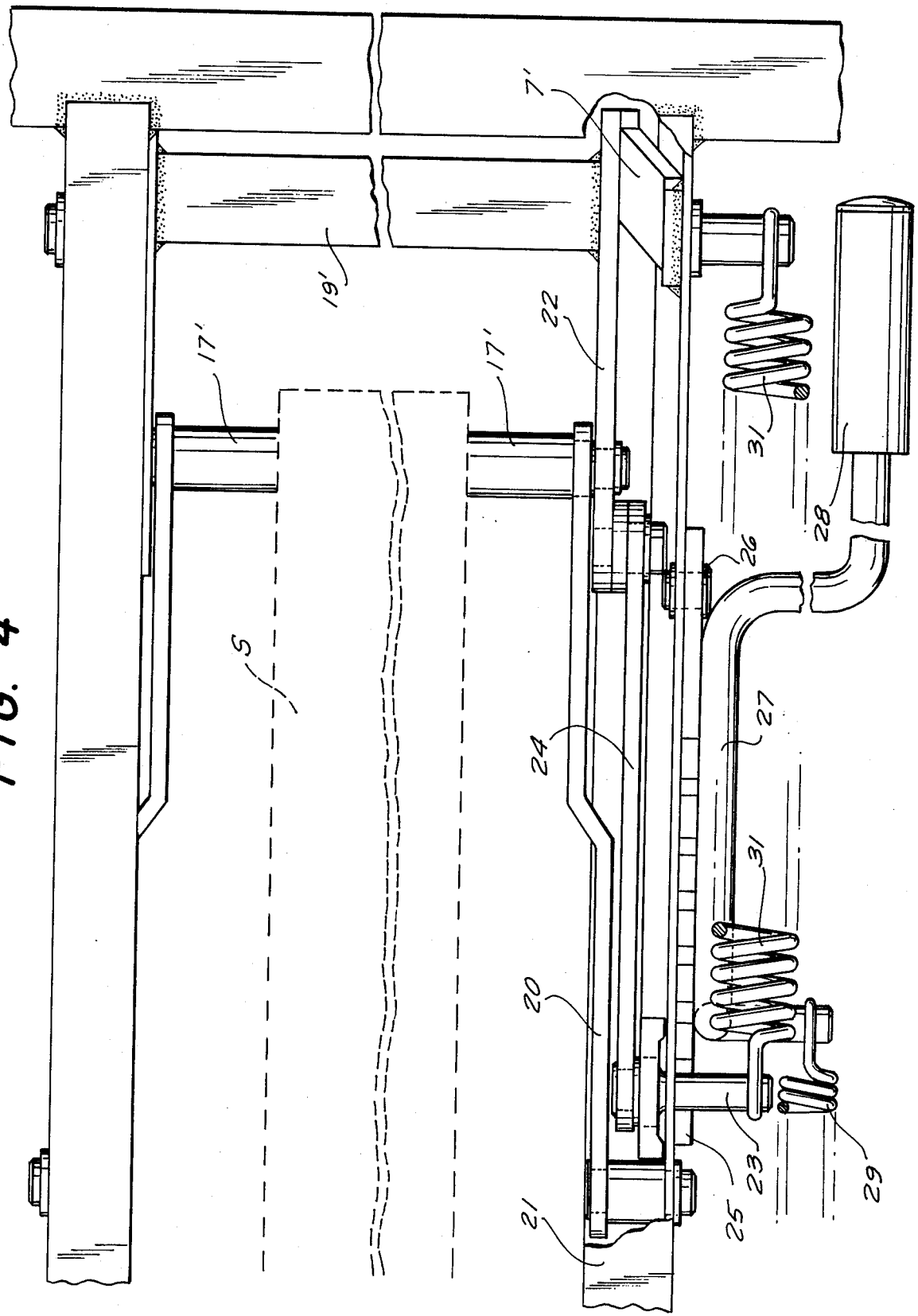
FIG. 4 is a top view to the device shown in FIG. 3, but illustrating also a second device at the other side of the seat.

A particular advantage of the construction according to the present invention results from the fact that the subframe or support elements which is connected with the arrangement via the pivot 17 can enter into the seat frame having the side portions 5 (or portions 21, see FIG. 4). Despite the fact that the levers 6 and 8 in this condition are completely longitudinally extended, the biasing action of the spring 14 will, due to the slightly offset or cranked design of the lever 8 and the U-shaped configuration of the lever 6, be sufficient for the seat to move from the fully retracted position of FIG. 2 back to the position of FIG. 1 under the influence of the spring 14, when the weight acting upon the seat is removed and the pin 12 is released for sliding movement.

Figure 3:
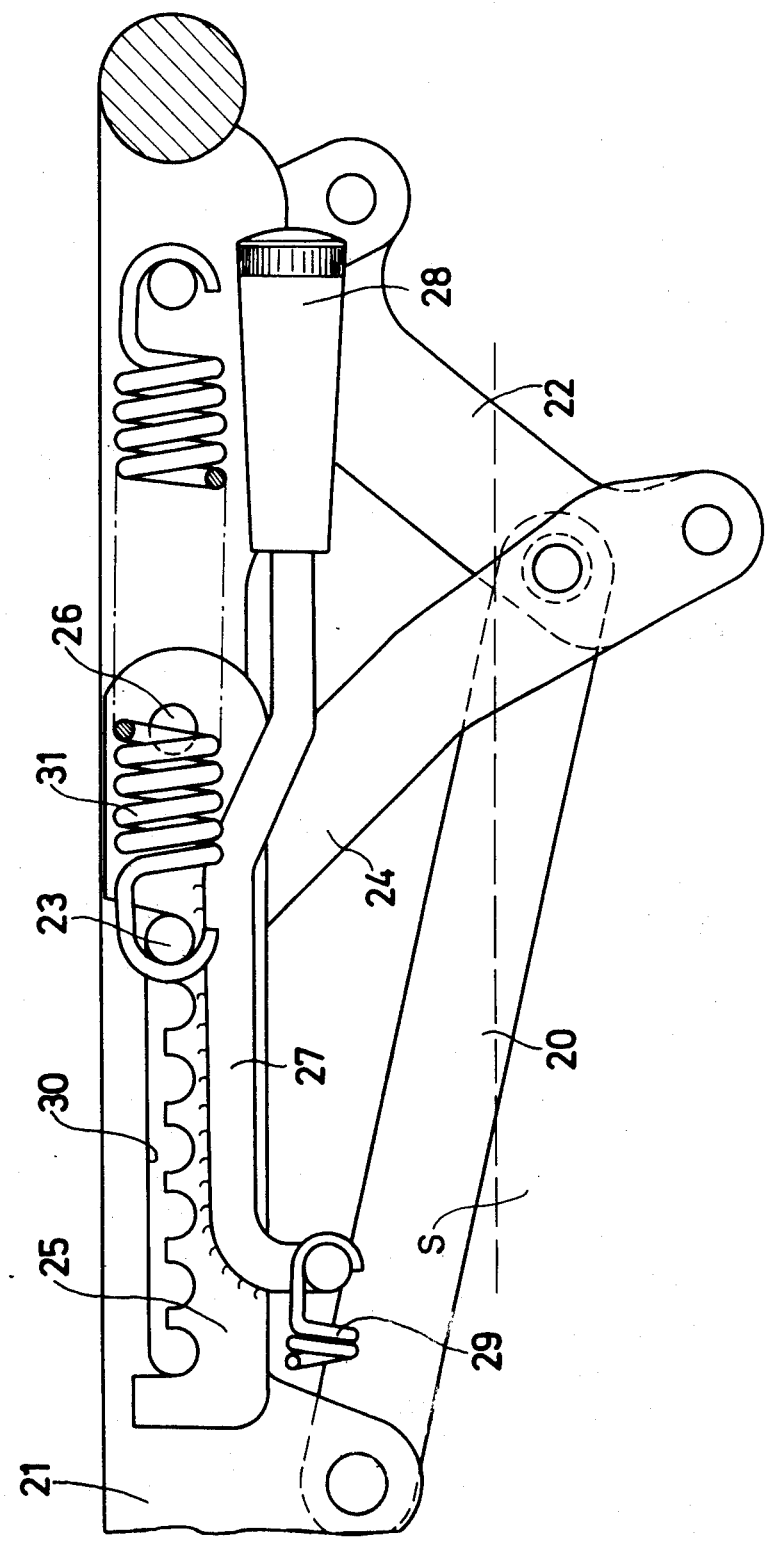
FIG. 3 is a view similar to FIG. 1, but illustrating a further embodiment of the invention.

FIG. 3, finally, illustrates an embodiment constituting a modification of the one in FIGS. 1 and 2, but having basically the same arrangement. In FIG. 3 the "folding rocker arm" of FIGS. 1 and 2 is stabilized by means of a rod 20 which is pivoted to the U-shaped lever 22 (corresponding to the lever 6 of FIG. 1) and the frame portion 21 (corresponding to the frame portion 5 of FIG. 1). To arrest the pin 23 which corresponds to the pin 12 of FIG. 1, and thereby arrest the lever 24 which corresponds to the lever 8 of FIG. 1, in a desired position, FIG. 3 utilizes a toothed plate 25 which engages the pin 23 and which is pivoted to the frame portion 21 by means of a bolt, pin or the like identified with reference numeral 26. A lever 27 having a handle 28 is rigidly secured to the plate 25, for instance by welding, and is of such a length and so formed that it is located laterally of the seat and can be readily engaged by the hand of a user, so that it can be tilted against the force of a spring 29 to move the plate 25 and thereby disengage the pin 23 from the same, permitting it to move in the longitudinal slot 30, so that the pin 23 can move in this slot 30 and the seat can move upwardly or downwardly with the aid of or against the action of the spring 31.

FIG. 4 is a top view to the device shown in FIG. 3, but illustrating the device in its fully retracted state corresponding to FIG. 2. Furthermore FIG. 4 shows a second device from the same type at the other side of the seat connected to the first device by a shaft 19'. Both devices are connected via pivots 17' with the subframe or support element S which is diagrammaticaly shown. While FIG. 3 shows the device with a strap which is pivoted to the seat element, i.e. the frame portion 21, FIG. 4 shows the arrangements with a strap 7' fixedly connected to said seat elements.

It will be understood that each of the elements described above, or two or more together, may also find a useful application in other types of constructions differing from the types described above.

While the invention has been illustrated and described as embodied in a seat construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a seat, particularly a vehicle seat, a combination comprising a support element; a seat element above said support element; and means for adjusting the position of said elements relative to one another, comprising an elongated strap connected to said seat element, a bracket of substantially U-shaped configuration having a bight and two arms extending transversely of said bight substantially in the same direction and bounding with said bight an open side of said bracket, one of said arms having a length substantially corresponding to that of said strap and being pivotally connected to the latter, said bracket being mounted on said support element for pivoting about an axis, and means for pivoting said bracket about said axis and including an elongated lever extending away from said open side and having longitudinally spaced ends one of which is pivotally connected to the other arm of said bracket and the other of which is mounted in said seat element for shifting in a substantially horizontal plane between, and for arresting in a selected one of a plurality of positions.

2. A combination as defined in claim 1, wherein said seat element includes a frame; and wherein the length of said other arm of said bracket corresponds substantially to the height of said frame.

3. A combination as defined in claim 1, wherein said one end of said lever is offset relative to the plane of said lever.

4. A combination as defined in claim 1, wherein said strap is fixedly connected to said seat element.

5. A combination as defined in claim 1, wherein said strap is pivoted to said seat element.

6. A combination as defined in claim 5; and further comprising a stabilizing rod extending between and pivoted to said seat element and said bracket respectively.

7. A combination as defined in claim 1, wherein said lever is provided with a pin in the region of said seat element, said seat element having a portion formed with a slot in which said pin is slidably received; and further comprising a spring having one fixed end and another end connected to said pin so as to urge the same to move in one direction in said slot.

8. A combination as defined in claim 7, wherein said portion of said seat element is a plate formed with teeth along said slot and pivotably mounted on said seat element, said teeth being engageable with said pin for arresting the same against sliding movement in said slot.

9. A combination as defined in claim 1, wherein said adjusting means comprises an additional strap, an additional bracket, and an additional lever all similar to the first-mentioned strap, bracket and lever but located at a side of said seat element opposite the one where the first-mentioned strap, bracket and lever are located; and further comprising a shaft fixedly connected with said first-mentioned and additional brackets.

10. In a seat, particularly a vehicle seat, a combination comprising a support element; a seat element above said support element; and means for adjusting the position of said seat element relative to said support element, including a bracket mounted on one of said elements for pivoting through a plurality of positions between an extended and a retracted position, and having a bight and two arms of predetermined lengths extending transversely of said bight toward said one element, an elongated lever having one end pivoted to one of said arms of said bracket and another end mounted at the seat for displacement relative thereto, a strap connected to the other of said elements and having a length substantially corresponding to said length of the other of said arms of said bracket, said other arm of said bracket being pivoted to said strap so that when said bracket is in said retracted position thereof, said other arm of said bracket is substantially coextensive with said strap and said bight of said bracket is proximate to said other element, and means for arresting said bracket in a selected one of said positions thereof.

* * * * *